(12) United States Patent
Yasutomi

(10) Patent No.: US 6,785,452 B2
(45) Date of Patent: Aug. 31, 2004

(54) FIBER OPTIC CABLE WITH CUSHIONING MEMBER

(75) Inventor: Tetsuya Yasutomi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 119 days.

(21) Appl. No.: 10/176,169

(22) Filed: Jun. 18, 2002

(65) Prior Publication Data

US 2003/0002829 A1 Jan. 2, 2003

(30) Foreign Application Priority Data

Jun. 19, 2001 (JP) .......................................... 2001-185584

(51) Int. Cl.[7] ................................................. G02B 6/44
(52) U.S. Cl. ........................ 385/102; 385/103; 385/113
(58) Field of Search ................................. 385/100–114

(56) References Cited

U.S. PATENT DOCUMENTS

| | | | | |
|---|---|---|---|---|
| 4,802,732 A | * | 2/1989 | Fukuma et al. ............. | 385/105 |
| 4,944,570 A | * | 7/1990 | Oglesby et al. ............. | 385/101 |
| 6,253,012 B1 | * | 6/2001 | Keller et al. ................. | 385/109 |
| 6,304,699 B2 | * | 10/2001 | Field et al. .................. | 385/100 |
| 6,305,875 B1 | * | 10/2001 | Matsumoto .................. | 405/16 |
| 6,330,385 B1 | * | 12/2001 | Sheu .......................... | 385/109 |
| 6,597,850 B2 | * | 7/2003 | Andrieu et al. ............. | 385/128 |
| 2002/0031314 A1 | * | 3/2002 | Yasutomi et al. ........... | 385/113 |

OTHER PUBLICATIONS

U.S. patent application Ser. No. 09/963,376, filed Sep. 27, 2001.

* cited by examiner

Primary Examiner—John D. Lee
Assistant Examiner—Tina M Lin
(74) Attorney, Agent, or Firm—Oblon, Spivak, McClelland, Maier & Neustadt, P.C.

(57) ABSTRACT

An optical fiber cable that has a cable core formed by covering an external circumference of a coated optical fiber or a collective coated optical fiber with a cushioning member, a tension member, and a thermoplastic resin sheath for collectively covering the cable core and the tension member, wherein the cushioning member contains a blended fiber composed of a non-water absorbent fiber and a water absorbent fiber.

7 Claims, 3 Drawing Sheets

FIBER OPTIC CABLE WITH CUSHIONING MEMBER

FIELD

The present invention relates to an optical fiber cable constituted by fabricating a coated optical fiber into a cable.

BACKGROUND

In recent years, with the increase in demands for large capacity data transmission, an optical fiber cable that allows large capacity communication has expanded its fields of application to be utilized as a backbone line of a long haul communication network. At the same time, with, for example, the remarkable increase in utilization of communication lines by individuals represented by the Internet, construction of optical cable networks is in urgent need more than ever.

Under such circumstances, optical fiber cables are used under various environments, and thus development of a cable excellent in heat resistance and waterproof property is becoming important. In general, it is conceivably possible that, in the case of the optical fiber cables for underground installations, a sheath of a cable is damaged to cause water to penetrate inside the cable, and optical fibers in the cable are left being flooded for a long period of time. Thus, in order to prevent the penetration of water into the cable and migration of water in a longitudinal direction, various water blocking means are known and measures therefor are applied.

In addition, characteristics of an optical fiber cable depend largely on characteristics of its covering material and the like, not to mention characteristics of its coated optical fibers. For example, a transmission loss increases due to microbending that is given to a coated optical fiber because of a dimensional change of a covering layer.

FIG. 3 shows an example of a waterproof optical fiber cable that has been proposed recently. The optical fiber cable 31 has a cable core formed by covering an external circumference of a plurality of optical fiber ribbon 32 with a cushioning member 37 formed by twisting around a string-like fiber 33 having water absorbency in one direction, tension members 34 disposed outside the cable core, and a sheath 35 collectively covering the cable core and the tension member and which sheath is composed of a thermoplastic resin or the like.

In this conventional optical fiber cable, the cushioning member 37 having water absorbency is employed as a water blocking measure and plays its role.

In addition, in the optical fiber cable of this type, it is a general practice to use the string-like fiber 33 that is a super water-absorbent polymer, such as a polyacrylic acid-based polymer and a polyvinyl alcohol-based polymer, as the cushioning member 37 having water absorbency. When the string-like fiber 33 is used as the cushioning member 37, it is a general practice to wind the string-like fiber 33 around the coated optical fiber in a spiral manner in a fixed direction or in a reversed direction.

In such a conventional technique, it is necessary to pay attention to water absorption and swelling of a cushioning member. That is, it is necessary to select a super water-absorbent polymer to form a string-like fiber, and to form the cushioning member in a density as low as possible, in order to facilitate the fiber to absorb water to swell. However, it has been found that, when the fiber to form the cushioning member is used at a low density, its water absorption and swelling characteristics are satisfactory, but large shrinkage by heat occurs, and the string-like fiber shrinks due to high temperature hysteresis after fabrication of a cable. Accordingly, in particular, if the string-like fiber is wound in a fixed direction or in a reversed direction, there is a possibility that the string-like fiber excessively tighten a coated optical fiber to increase a transmission loss.

SUMMARY

The present invention is an optical fiber cable that comprises: a cable core formed by covering an external circumference of a coated optical fiber or a collective coated optical fiber with a cushioning member; a tension member; and a thermoplastic resin sheath for collectively covering the cable core and the tension member, wherein the cushioning member comprises a blended fiber composed of a non-water absorbent fiber and a water absorbent fiber.

Other and further features and advantages of the invention will appear more fully from the following description, taken in connection with the accompanying drawings.

DETAILED DESCRIPTION

Figure 1:
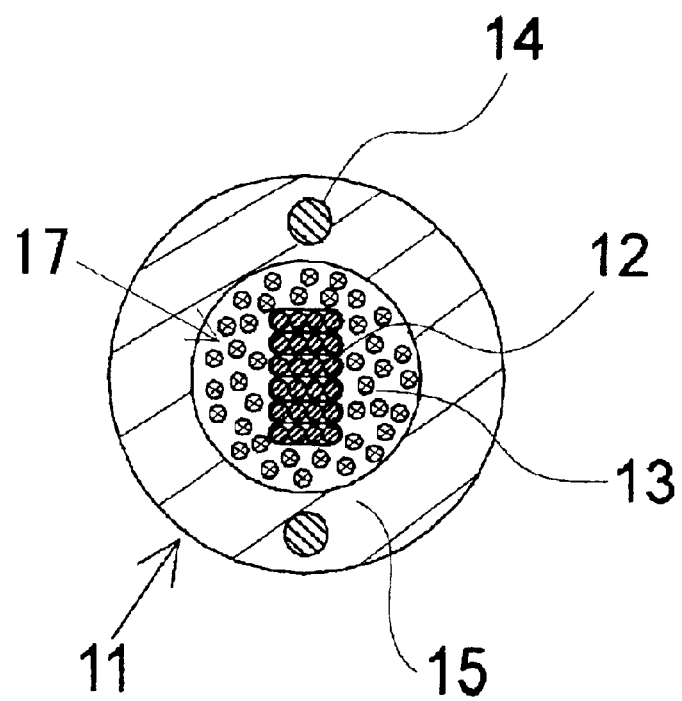
FIG. 1 is a schematic view illustrating a cross sectional structure of an optical fiber cable of the present invention, which is obtained in Example 1.

According to the present invention, there is provided the following means:

(1) An optical fiber cable which comprises:

a cable core formed by covering an external circumference of a coated optical fiber or a collective coated optical fiber with a cushioning member, a tension member, and a thermoplastic resin sheath that collectively covers the cable core and the tension member;

wherein the cushioning member comprises a blended fiber composed of a first non-water absorbent fiber and a water absorbent fiber;

(2) The optical fiber cable as described in the above item (1), wherein a degree of heat shrinkage of the cushioning member is 1.0% or less when the cushioning member is held at a temperature of 130° C. for 30 minutes; and (3) The optical fiber cable as described in the above item (1) or (2), wherein the cushioning member comprises the blended fiber and a second non-water absorbent fiber.

According to the present invention, heat shrinkage of a cushioning member can be suppressed, tightening of a coated optical fiber by the cushioning member can be reduced, and as a result, an increase in a transmission loss can be reduced, by employing, as a cushioning member, a fiber formed by blending a fiber having no water absorbency, with a fiber having water absorbency though it has a high degree of heat shrinkage.

A preferred embodiment of an optical fiber cable of the present invention will be hereinafter described in detail.

In the present invention, a coated optical fiber means not only an optical fiber provided with a covering layer, but also a collective optical fiber in which a plurality of optical fibers are collectively covered, such as an optical fiber ribbon, an optical fiber bundle and the like.

The coated optical fiber for use in the present invention is constituted by one or a plurality of optical fibers with an external diameter of approximately 100 μm to 250 μm, to which fiber a resin coating is applied. The optical fiber is one selected from a silica optical fiber, a multi-component optical fiber and a plastic optical fiber. The coating layer is not specifically limited, as long as it is made of a silicon resin, nylon resin, ultraviolet-curing acrylate-based resin and the like, and is applied to be a layer thickness of about 100 to 300 μm.

In the present invention, a cable can be constituted by laminating a plurality of (preferably about 2 to 10) coated optical fibers and utilizing these fibers as a collective body.

The cushioning member for use in the present invention is characterized by containing a blended fiber composed of a non-water absorbent fiber and a water absorbent fiber.

The non-water absorbent fiber for use in the present invention is preferably a fiber that is not water absorbent and has a low degree of heat shrinkage, such as a polypropylene fiber, a nylon fiber, a polyester fiber, and the like. The degree of heat shrinkage of the non-water absorbent fiber is preferably 0.1 to 0.5%, and more preferably approximately 0.2% or less, and 0.1% or more.

In addition, as the water absorbent fiber for use in the present invention, can be mentioned are a polyacrylic-based fiber, a polyvinyl alcohol-based fiber, and the like. These fibers have a high degree of heat shrinkage but are water absorbent. These fibers absorb water as much as 50 times their weight. The degree of heat shrinkage of the water absorbent fiber is preferably 0.5 to 5%, and more preferably approximately 3%.

The blended fiber is formed by blending and spinning a water absorbent fiber having a high degree of heat shrinkage together with a fiber having a non-water absorbent property and a low degree of heat shrinkage. In this blending process, a blending ratio can be changed to adjust a degree of heat shrinkage of the blended fiber. In the case of obtaining a blended fiber with a degree of heat shrinkage of 1%, the blending ratio of a water absorbent fiber is approximately 20 to 80% by mass with respect to a total amount of the blended fiber, although it changes according to a type of fibers used. In addition, a size of the blended fiber is generally 2,000 to 10,000 deniers, and preferably 3,000 to 6,000 deniers.

It is a blended fiber that is used in the cushioning member for use in the present invention. The effect intended in the present invention could not be attained with yarn doublings that were formed by simply twisting a non-water absorbent fiber and a water absorbent fiber together. Although details of reasons for the above is unclear, it may be because winding shrinkage was caused in the simple yarn doublings when they were heated.

In addition, the cushioning member for use in the present invention may include another (second) non-water absorbent fiber, in addition to the non-water absorbent fiber included in the blended fiber. As the second non-water absorbent fiber, a non-water absorbent fiber that is identical with or different from those used in the blended fiber may be used. In this case, a blending ratio of the non-water absorbent fiber is preferably approximately 5 to 50% by weight with respect to the total amount of the cushioning member.

By mixing the second non-water absorbent fiber together with the blended fiber in the cushioning member in this way, the degree of heat shrinkage of the cushioning member can be adjusted easily not only in the blended spinning process but also in a manufacturing process of an optical fiber cable. Moreover, since a non-water absorbent fiber costs less than a water absorbent fiber, an optical fiber cable having the cushioning member mixed with the second non-water absorbent fiber can be manufactured at lower costs as compared with an optical fiber cable having a cushioning member made only of a blended fiber.

The cushioning member for use in the present invention is formed by applying a blended fiber or a blended fiber and a non-water absorbent fiber to the external circumference of a coated optical fiber or a collective coated optical fiber, in a manner that the fiber(s) for cushioning member is wound around and/or attached in a longitudinal direction along the coated optical fiber(s). A thickness of the layer is appropriately set according to a diameter of an optical fiber cable to be manufactured.

In addition, the degree of heat shrinkage of the cushioning member for use in the present invention is generally equal to or lower than 1.0%, preferably equal to or lower than 0.8%, and more preferably equal to or lower than 0.4%, when it is held at a temperature of 130° C. for 30 minutes. If the degree of heat shrinkage is higher than 1.0%, an increase in a transmission loss becomes equal to or higher than 0.1 dB/km when it is held at a temperature of 70° C. for 6 hours. In that case, when there is a high temperature history or when the cushioning member encounters a high temperature condition while being used, it sometimes cannot endure a long term use.

This characteristic not only has a functional effect to prevent an increase of a transmission loss that is caused because the cushioning member tightens the coated optical fiber, when the optical fiber cable is exposed to a high temperature as described above; but also has an effect to prevent microbending of the fiber that is caused due to a heating at the time of coating a thermoplastic resin, in the manufacturing process of the optical fiber cable.

As a tension member used in the present invention, a steel wire is particularly suitable, and in addition, Kevlar (a trade name of a polyaramide fiber manufactured by DuPont), FRP (fiber reinforcement plastic) and the like, are preferable. An appropriate number, one or more, of the tension members can be applied in a manner attached in a longitudinal direction along a cable core. It is preferable to dispose them in positions substantially symmetrical with each other, around the external circumference of the core.

As a material of the sheath for use in the present invention, which sheath is for collectively covering the cable core and the tension member, a thermoplastic resin, such as a polyvinyl chloride, a polyethylene, a nylon and a fluorinated ethylene propylene can be used. As means for covering, extrusion coating of the material around the cable core and the tension members is preferred. However, other conventional methods may be used.

In the present invention, materials, structures, and the like, of the coated optical fiber, the tension member, and the sheath formed with a thermoplastic resin, are not specifically limited.

This optical fiber cable can be used independently as an optical communication cable for a general use, and it may also be used in a state in which it is embedded in an electric power cable. In particular, the optical fiber cable can maintain a favorable transmission characteristic and water blocking property so that it is preferably used, even in a use in a condition with a large environmental variation, such as outdoor installation.

Further, measurement of characteristic values in the present invention was carried out as follows:

(1) Degree of Heat Shrinkage

Five specimens with the length of 1300 mm were randomly sampled. The specimens were applied with an initial load, and thereafter gauge marks were made at an interval of 1000 mm. After heating the specimens at a temperature of 130° C. for 30 minutes, they were taken out to be cooled down to a room temperature. The specimens were applied with an initial load again, and a distance between the gauge marks were measured. With each of specimens, a degree of shrinkage was calculated, and an average value of the shrinkage degrees of the five specimens was found.

(2) Increase in a Transmission Loss

A drum-wound optical fiber cable with the length of 1000 m was kept in a thermostatic bath of 70° C. for 6 hours, and a transmission loss at a wavelength of 1.55 $\mu$m was measured by an OTDR (Optical Time Domain Reflectometry). The obtained transmission loss was compared with a transmission loss that was measured in the same manner with the above except for employing a cable kept under an ordinary temperature, to find its increase amount.

According to the present invention, a blended fiber that is obtained by blending a water absorbent fiber having a high degree of heat shrinkage with a non-water absorbent fiber, such as polypropylene, nylon, and polyester, is employed as a cushioning member, whereby heat shrinkage of the cushioning member can be suppressed. As a result, tightening of coated optical fibers by the cushioning member can be lowered, to reduce a transmission-loss increase. In particular, if the degree of heat shrinkage of the cushioning member is adjusted to equal to or lower than 1.0%, there can be obtained an excellent effect of reducing the increase in the transmission loss to 0.06 dB/km or less.

In addition, this optical fiber cable has no practical problem in terms of waterproof property, and can be favorably used for a long time under severe environments. The optical fiber cable of the present invention has improved heat resistance and water-resisting property.

Next, examples of the present invention will be shown in conjunction with the drawings. However, the present invention is not limited to the examples demonstrated below and can take various modes within the scopes described in claims.

Figure 2:
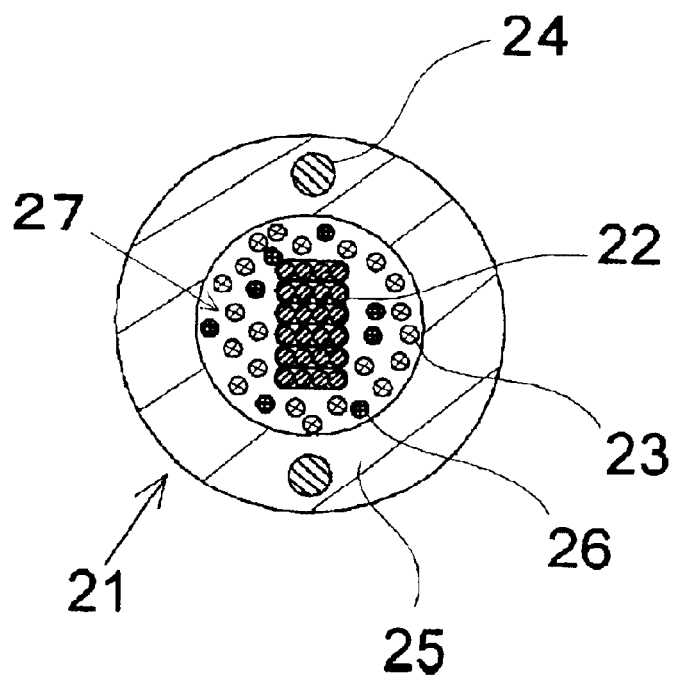
FIG. 2 is a schematic view illustrating a cross sectional structure of an optical fiber cable of the present invention, which is obtained in Example 2.
Figure 3:
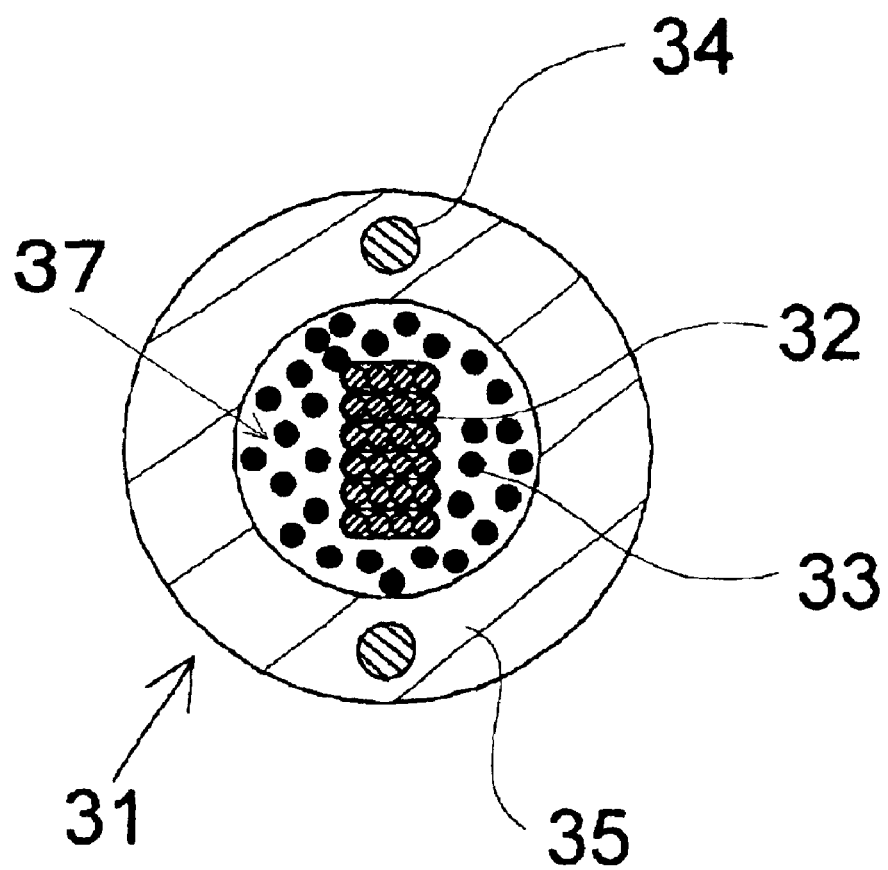
FIG. 3 is a schematic view illustrating a cross sectional structure of an example of a conventional optical fiber cable.

It should be noted here that, in FIGS. 1, 2 and 3, a blank portion is shown together with cross sections of fiber(s) in a cushioning member. This is for ease of understanding the drawings. It is needless to mention that almost no blank portion practically exists on the cross section of the cushioning member since the fiber(s) forming the cushioning member is actually wound around the coated optical fiber ribbon tightly.

EXAMPLES

Example 1

Figure 4:
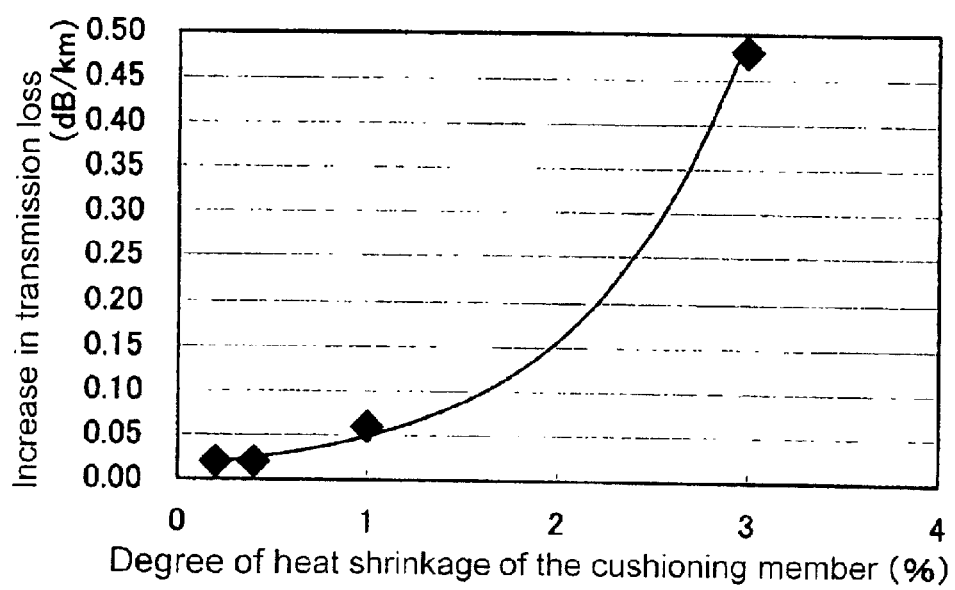
FIG. 4 is a graph showing a relationship between increase in a transmission loss and degree of heat shrinkage of a cushioning member according to the present invention used in Example 1.

An optical fiber cable 11 shown in FIG. 1 was prepared as follows: An optical fiber ribbon 12 was constituted by coating an ultraviolet-curable resin around an external circumference of four bare silica optical fibers, each of which had an external diameter of 120 $\mu$m. A cable core was obtained by covering an external circumference of a collective coated optical fiber, which included a laminated body of six optical fiber ribbons, with a cushioning member 17 formed by winding a blended fiber 13 in one direction. Two tension members 14, each of which was formed with an aromatic polyamide fiber, were disposed in a longitudinal direction along the outside of the cable core. The cable core and two tension members 14 were collectively covered by a sheath 15 composed of a thermoplastic resin (urethane acrylate-base resin), to prepare an optical fiber cable with the diameter of approximately 10 mm. The cushioning member 17 was formed with a blended fiber obtained by the blended spinning of a non-water absorbent polyester fiber and a water absorbent polyacrylic fiber. A degree of heat shrinkage of the cushioning member 17 was varied by changing a blending ratio of the non-water absorbent fiber and the water absorbent fiber. The degree of heat shrinkage of the cushioning member 17 and the increase in a transmission loss of the cable were measured, and the results shown in Table 1 below were obtained. FIG. 4 is a graph obtained by plotting the results. By decreasing the degree of heat shrinkage of the cushioning member 17 held at a temperature of 130° C. for 30 minutes to 1.0% or less, the increase in the transmission loss of the cable held at a temperature of 70° C. for 6 hours was successfully reduced to less than 0.1 dB/km, which was a practically effective value.

TABLE 1

| Degree of heat shrinkage of cushioning member (%) (held at 130° C. for 30 minutes) | Increase in transmission loss (dB/km) (held at 70° C. for 6 hours) |
| --- | --- |
| 0.2 | 0.02 |
| 0.4 | 0.02 |
| 1.0 | 0.06 |
| 3.0 | 0.48 |

Example 2

An optical fiber cable 21 shown in FIG. 2 was prepared, in the same manner as the optical fiber cable 11 of Example 1. The optical fiber cable 21 was similar to the optical fiber 11 in Example 1, in the point that a cable core obtained by covering an external circumference of a laminated body of the six four-core optical fiber ribbons 22 with a cushioning member 27, and tension members 24 disposed outside the cable core, were collectively covered by a sheath 25 comprising a thermoplastic resin.

However, the optical fiber cable 21 was different from the cable in Example 1, in the point that the cushioning member 27 comprised a non-water absorbent polypropylene fiber 26, in addition to a fiber 23 obtained by the blended spinning of a non-water absorbent polyester fiber and a water absorbent polyacrylic fiber.

Further, the water blocking property of the optical fiber cables 11 and 21 of Examples 1 and 2, was tested by a method described below.

Figure 5:
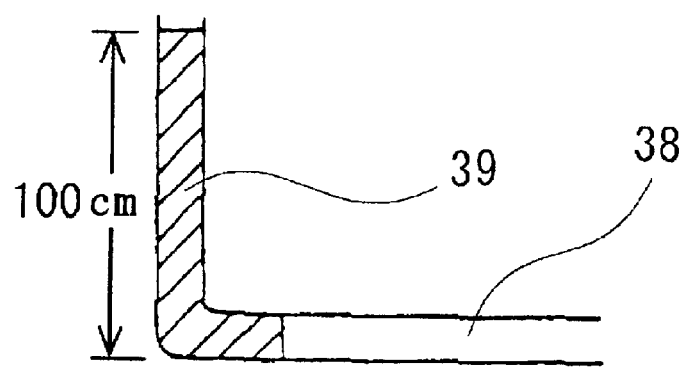
FIG. 5 is a schematic view for describing an experimental method for confirming a water blocking property of an optical fiber cable.

That is, as shown in FIG. 5, a hydrostatic pressure of 100 cm was applied by a colored water 39 to a cross section of an optical fiber cable specimen 38, and it was held for 24 hours. Then, a length of migration of water was measured. This test was conducted with the specimens having the cushioning members whose degree of heat shrinkage were 1.0, 0.4 and 0.2, in Examples 1 and 2. The length of migration of water was 43 to 55 cm with the specimens in Example 1, and 50 to 67 cm with the specimens in Example 2.

In both cases, the length of migration of water was within 100 cm. Accordingly, it was confirmed that the migration of water in the longitudinal direction was effectively prevented, and the optical fiber cable had no practical problem.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical fiber cable which comprises:
    a cable core formed by covering an external circumference of a coated optical fiber or a collective coated optical fiber with a cushioning member;
    a tension member; and
    a thermoplastic resin sheath that collectively covers said cable core and said tension member, wherein
        said cushioning member comprises a blended fiber composed of a first non-water absorbent fiber and a water absorbent fiber, and
        a degree of heat shrinkage of the cushioning member when said cushioning member is held at a temperature of 130° C. for 30 minutes, is 0.8% or less.

2. The optical fiber cable as claimed in claim 1, wherein said cushioning member comprises the blended fiber and a second non-water absorbent fiber.

3. The optical fiber cable as claimed in claim 2, wherein a blending ratio of the non-water absorbent fiber is 5 to 50% by weight with respect to the total amount of the cushioning member.

4. The optical fiber cable as claimed in claim 1, wherein a blending ratio of the water absorbent fiber is 20 to 80% by weight with respect to a total amount of the blended fiber.

5. The optical fiber cable as claimed in claim 1, wherein a size of the blended fiber is 2,000 to 10,000 deniers.

6. The optical fiber cable as claimed in claim 1, wherein the non-water absorbent fiber forming the blended fiber is at least one fiber selected from the group consisting of a polypropylene fiber, a nylon fiber, and a polyester fiber.

7. The optical fiber cable as claimed in claim 1, wherein the water-absorbent fiber is at least one fiber selected from the group consisting of a polyacrylic fiber, and a polyvinyl alcohol fiber.

* * * * *